Aug. 31, 1965 D. E. BECKETT 3,203,439
SPOOL VALVE WITH MAGNETIC HOLD
Filed Oct. 9, 1962 2 Sheets-Sheet 1

INVENTOR.
DONALD E. BECKETT
BY
ATTORNEY

INVENTOR.
DONALD E. BECKETT

United States Patent Office 3,203,439
Patented Aug. 31, 1965

3,203,439
SPOOL VALVE WITH MAGNETIC HOLD
Donald E. Beckett, Wilmington, Ohio, assignor to Beckett-Harcum Co., Wilmington, Ohio, a corporation of Ohio
Filed Oct. 9, 1962, Ser. No. 229,349
5 Claims. (Cl. 137—102)

This invention relates to spool valves, and in particular to spool valves having permanent magnets associated therewith in such a manner as to preclude actuation of said valves until a positive, predetermined pressure has been built up against an end of the spool sufficient to overcome the force of a magnet which holds the spool at an end of its stroke against accidental or unintentional displacement therefrom.

An object of the invention is to provide a spool valve having the hereinabove described characteristics which, when provided with magnetic holding means for each end of a reciprocable spool, will provide a valve which will continuously and automatically shift the spool from one end of its stroke to the other, and wherein the spool will be securely though releasably maintained at one or the other of the ends of its stroke until dislodged therefrom by the application of a positive, deliberate force.

Another object of the invention is to provide a fluid control valve of the sliding spool type, which is greatly simplified, having but a single movable part incorporated therein so as to render the valve foolproof, highly durable, and indefinitely service-free.

Another object of the invention is to minimize the manufacturing and assembling cost of a sliding spool type, automatically reversing valve for the control of a fluid under pressure, such as compressed air or other gaseous media.

A further object is to provide a valve of the character stated, which is compact, smooth in operation, and small in size, with no delicate parts subject to wear, frequent replacement or adjustment.

The foregoing and other objects are attained by the means described herein and illustrated upon the accompanying drawings, in which.

Figure 1:
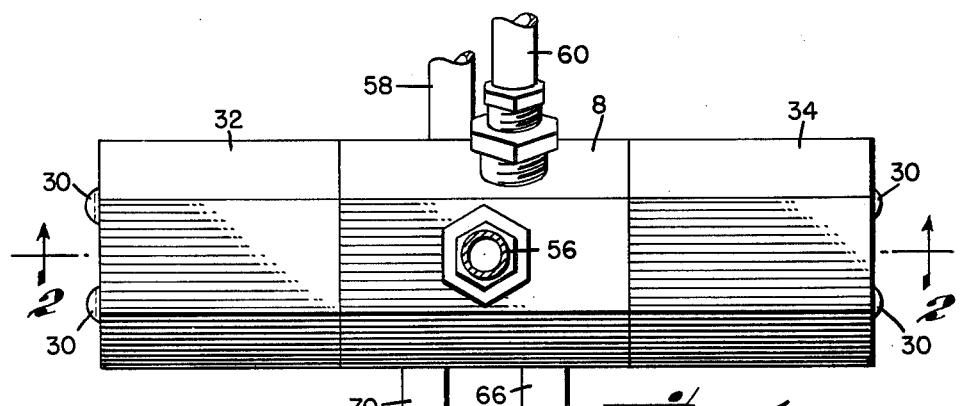
FIG. 1 is a top plan view of the valve embodying the present invention.

In the drawings, the numeral 8 indicates the body of the valve constructed of any suitable material, such as metal, and having formed therein a smooth straight bore 10 extending from one end 12 to the opposite end 14 of the valve body. Mounted within the bore 10 for limited bodily reciprocation, is the cylindrical valve spool indicated generally by the character 16.

Opposite ends 18 and 20 of the valve spool carry ferrous metal heads or armature elements 22 and 24, to be alternatively attracted by permanent magnets 26 and 28 which are fixed relative to the valve body. As shown at 18 and 20, the end portions of spool 16 may be externally screw-threaded, if desired, to enter internally threaded bores in the heads or armatures, so that the latter may be adjustably positioned along the length of the spool in order to adjust the stroke of the spool.

From the foregoing, it will be understood that the valve spool, when not influenced by other forces, may be shifted to the left or to the right (FIGS. 2 and 4), and will be held in either of such positions by the fixed magnets 26 or 28, as the drawings indicate.

Magnets 26 and 28 may be fixed by means of screws 30 or other fastening means, inside the hollow caps 32 and 34 which are butted against and secured to the ends of the valve body. The hollow caps provide fluid chambers 36 and 38, into which extend the magnets, their armatures, and the ends of the valve spool.

Valve spool 16 in the example illustrated is turned to provide a pair of end pistons 40 and 42, and a pair of spaced intermediate lands 44, 46, which snugly but slidably fit the longitudinal main bore 10 of the valve body. Between the lands and pistons are located the fluid distribution grooves 50, 52, 54. Between the lands 44 and 46, fluid under pressure may be fed constantly by way of a main supply pipe 56, for distribution to one or the other of a pair of fluid conveying pipe lines 58 or 60, depending upon the position of the valve spool as shifted to the right or left within the valve body.

Figure 2:
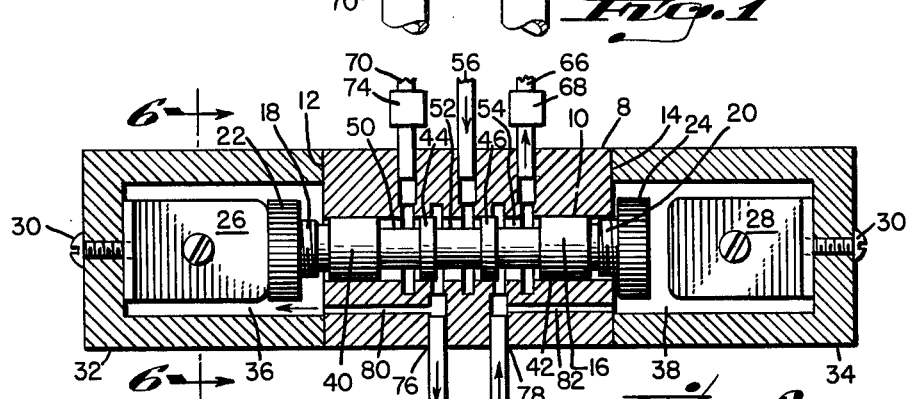
FIG. 2 is a longitudinal cross-section taken on line 2—2 of FIG. 1, with the ports shown diagrammatically and rearranged in the interests of simplicity and clarity of disclosure with relation to a pneumatic cylinder.
Figure 5:
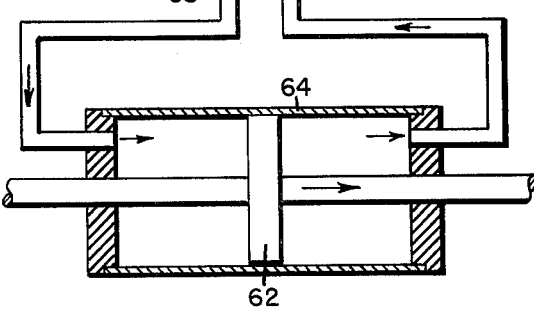
FIG. 5 is an end view of the valve shown in FIG. 1.
Figure 5:
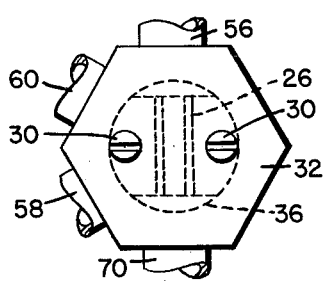
Figure 6:
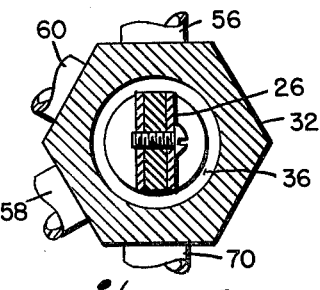
FIG. 6 is a cross-sectional view taken on line 6—6 of FIG. 2.
Figure 3:
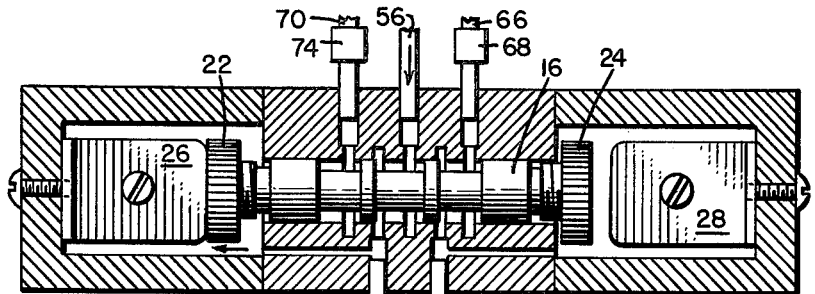
FIG. 3 is a view similar to FIG. 2, showing the valve and cylinder relationship occurring just prior to a reversing action.
Figure 3:
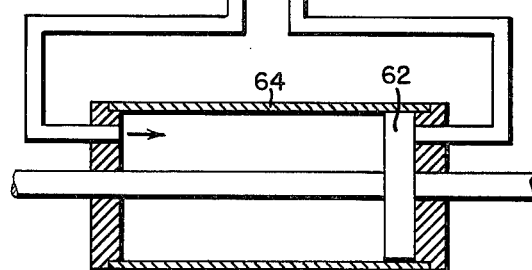
Figure 4:
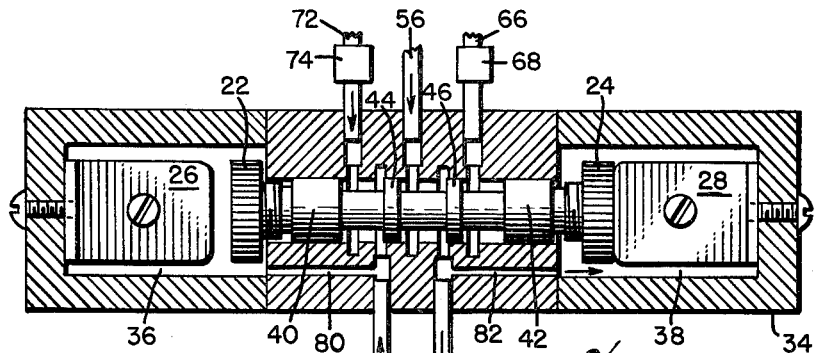
FIG. 4 is a view similar to FIG. 3, showing the relationship occurring at the instant of reversing of the pneumatic cylinder piston travel.
Figure 4:
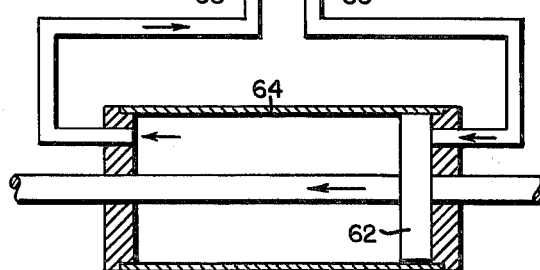

As will be apparent from the disclosures of FIGS. 2 and 4, shifting of the valve spool to the left results in the introduction of fluid under pressure to pipe line 58, for moving, for example, a pneumatic cylinder piston 62 to the right. The other pipe line 60 then becomes an exhaust line for the right end of cylinder 64, which exhausts through groove 54 and exhaust pipe 66 to atmosphere. Exhaust pipe 66 may have connected to it a needle valve, shown conventionally at 68, for establishing the rate of travel of piston 62. Under the above conditions, a second exhaust pipe 70 of the valve is sealed off by spool land 44, while land 46 confines incoming fluid pressure to the distribution groove 52 and pipe line 58.

In the illustration of FIG. 4, the valve spool has been shifted to the right within the valve body, thereby to direct fluid under pressure to pipe line 60 and enforce reverse movement of piston 62, or to the left. Here, land 46 seals off the exhaust pipe 66, while land 44 permits exhaust of fluid from pipe 58 to atmosphere through valve exhaust pipe 70, under the control of a needle valve 74 similar to that at 68, for limiting the rate of travel of piston 62 to the left. It may here be noted that spool lands 44 and 46 never move so far as to place either of the exhaust pipes 66 or 70 in direct communication with the main fluid supply pipe 56, within the valve body.

One of the objectives of the present invention is to provide simple and highly serviceable means to automatically reverse the travel of a pneumatic cylinder piston, for example, upon completion of a stroke in either direction, so that said piston will reciprocate to and fro automatically as long as pressure of fluid is delivered to the valve through main supply pipe 56.

In this connection it should be understood that a stroke of piston 62 may be determined either by an end wall of cylinder 64, or by any form of stop or resistance acting upon the piston rod to limit or establish its reach.

It should be understood further that fluid pressure responsive devices other than a pneumatic cylinder might be actuated by the valve, with automatic to-and-fro shifting of the valve spool resulting and performing useful functions. By way of example, grain or the like in a hopper or bin could be kept flowing by embedding therein a flexible "breather bag" or lung powered by compressed air under the control of the present valve, to alternately inflate and deflate the bag or lung continuously within the mass. Applications of the present valve to varying situations are numerous, wherefore the applications herein mentioned are to be considered purely exemplary, and not of a limiting nature.

The aforesaid automatic reciprocation or kindred actuation of a fluid pressure responsive device, such as piston 62, requires that the valve of the present invention be provided with at least two ports 76 and 78, each capable of conveying fluid both out of and into the valve. Such ports 76 and 78 are therefore referred to as in-and-out fluid ports, and as the drawings show, these have connection with the pipe lines 58 and 60 of the fluid pressure responsive device 62.

The in-and-out fluid port 76 is connected, by means of a by-pass or shunt passage 80, with the chamber 36 of end cap 32, so that fluid constantly surrounds the magnet 26, its armature, and the end portion 18 of valve spool 16. Pressure of fluid within chamber 36 is variable, and will increase to a maximum whenever the piston 62 of FIG. 2 reaches its limit of travel to the right, or otherwise is stopped. The resulting increased pressure of fluid in cap 32 acts upon the outer faces of armature 22 and piston 40, to unseat the armature from magnet 26 and drive the valve spool 16 to the right, see FIG. 4. The spool in this new position is held firmly by magnet 28 acting upon the adjacent armature 24, for directing pressure of fluid to pipe line 60 and thereby effecting reversal of travel of piston 62.

In like manner, pressure of fluid may be caused to build up in the chamber of the other end cap 34, through by-pass or shunt passage 82, which places said chamber in fluid communication with the in-and-out port 78 of the valve body. Thus, when piston 62 reaches the left-hand limit of travel, or is otherwise stopped en route, pressure of fluid will build up in pipe line 60, by-pass 82, and chamber 38, to act upon the outer faces of armature 24 and piston 42 for breaking the hold of magnet 28 upon armature 24 and shifting the valve spool to the left, as in FIG. 2. In this shifted position of the spool, fluid under pressure is directed into pipe line 58 for reversing the direction of travel of piston 62, or moving it to the right.

From the foregoing, it will be understood that each time the fluid pressure responsive device 62 reaches a limit of travel, or is otherwise stopped in its movement, pressure of fluid will build up at one end or the other of the spool valve, to effect a reversal of travel of the fluid pressure responsive device. The resultant action is one of alternate forward and reverse movements of the fluid pressure responsive device, which action continues indefinitely or as long as pressure of fluid is introduced into the intake port 56 of the valve.

As was previously mentioned herein, the fluid pressure responsive device is not necessarily a piston of a pneumatic cylinder; it might be in the nature of a container or a set of containers in which pressure of fluid might build up incident to having connection with the pipe lines 58, 60, or with the in-and-out ports 76 and 78 of the control valve.

The needle valves 68 and 74 incorporated in the exhaust-to-atmosphere ports 66 and 70 may be adjusted to establish a desired rate of flow through the valve and the device controlled thereby. Such needle valves, being independent of one another, make possible a variety of performance characteristics of the pressure responsive device. For instance, they may be adjusted to regulate the period of dwell at the end of the piston stroke, and to vary the rate of piston travel in each direction, individually. It is therefore apparent that the valve of the invention has many possibilities for use in controlling the action of various forms of machine tools and the like.

It is to be understood that various modifications and changes may be made in the structural details of the device, within the scope of the appended claims, without departing from the spirit of the invention.

What is claimed is:

1. An automatic fluid pressure operated valve for controlling movements of a fluid pressure responsive device, said valve having a body with a bore therein opening through opposite end walls of the body, a fluid entry port for introducing fluid under pressure into the bore, a pair of in-and-out fluid ports each performing to convey fluid outwardly to the fluid responsive device and back therefrom to the bore, and a pair of pressure diminishing ports exhausting to atmosphere from said bore, an elongate unitary valve spool within and shiftable longitudinally of said bore between two operative positions, said valve spool including a piston adjacent to each end and spaced lands intermediate and spaced from the pistons and fixed relative thereto and to one another, the pistons and lands being snugly reciprocable in the bore and the spaced lands and pistons providing three fluid distribution grooves located to direct fluid from said entry port to one of the in-and-out fluid ports while placing the remaining in-and-out fluid port in fluid communication with one of said exhaust ports in each of its two shifted positions, means forming a fluid chamber at each of the opposite ends of the bore and into each of which the adjacent end of the bore opens, an armature carried by each end of the valve spool for reciprocation therewith and located within the adjacent fluid chamber, a magnet secured in each chamber in a position to attract the adjacent armature, the magnets and armatures being so spaced as to hold the spool at either of the limits of its longitudinal shifting movement whenever the spool is shifted by a force in opposition to the holding force of one of the magnets, means whereby each of the fluid chambers has a constant fluid communication with one of the in-and-out fluid ports of the valve body, and means for adjusting each of the armatures longitudinally of the valve spool for changing the longitudinal stroke of the spool.

2. The invention as defined by claim 1 wherein the said means forming each fluid chamber comprises a hollow cap fixed to the end wall of the body and enclosing the adjacent armature and the cap having an end wall remote from the adjacent end of the valve body, to the inner side of which end wall the magnet is secured.

3. An automatic fluid pressure operated valve for controlling movements of a fluid pressure responsive device, said valve having a body with a bore therein opening through opposite end walls of the body, a fluid entry port for introducing fluid under pressure into the bore, a pair of in-and-out fluid ports each performing to convey fluid outwardly to the fluid responsive device and back therefrom to the bore, and a pair of pressure diminishing ports exhausting to atmosphere from said bore, an elongate unitary valve spool within and shiftable longitudinally of said bore between two operative positions, said valve spool including a piston adjacent to each end and spaced lands intermediate and spaced from the pistons and fixed relative thereto and to one another, the pistons and lands being snugly reciprocable in the bore and the spaced lands and pistons providing three fluid distribution grooves located to direct fluid from said entry port to one of the in-and-out fluid ports while placing the remaining in-and-out fluid port in fluid communication with one of said exhaust ports in each of its two shifted positions, means forming a fluid chamber at each of the opposite ends of the bore and into each of which the adjacent end of the bore opens, an armature carried by each end of the valve spool for reciprocation therewith and located within the adjacent fluid chamber, a magnet secured in each chamber in a position to attract the adjacent armature, the magnets and armatures being so spaced as to hold the spool at either of the limits of its longitudinal shifting movement whenever the spool is shifted by a force in opposition to the holding force of one of the magnets, means whereby each of the fluid chambers has a constant fluid communication with one of the in-and-out fluid ports of the valve body, and screw thread means coupling said armatures to the ends of the valve spool, the armatures being movable longitudinally of the valve spool by means of said screw thread coupling for changing the stroke of the spool.

4. An automatic fluid pressure operated valve for controlling movements of a fluid pressure responsive device, said valve having a body having opposite ends and having a bore therein opening through said ends, a fluid entry port for introducing fluid under pressure into the bore, a pair of in-and-out fluid ports each performing to convey fluid outwardly to the fluid responsive device and back therefrom to the bore, and a pair of relief ports exhausting to atmosphere from said bore, an elongate valve spool within and shiftable longitudinally of said bore between two operative positions, said valve spool having a piston adjacent to each end and spaced lands intermediate and spaced from the pistons and fixed relative thereto and to one another, the pistons and lands being snugly reciprocable in the bore and the spaced lands and pistons providing three fluid distribution grooves located to direct fluid from said entry port to one of the in-and-out fluid ports while placing the remaining in-and-out fluid port in fluid communication with one of said exhaust ports in each of its two shifted positions, means at each of said ends of the body forming a fluid chamber into which the adjacent end of the bore opens, each of said chambers having a cross sectional area materially greater than that of said bore, an armature in each chamber, means coupling each armature with the adjacent end of the spool, the armatures being reciprocated in the chambers by and upon reciprocation of the spool, a magnet secured in each chamber in a position in line with the adjacent armature to attract the latter, the magnets and armatures being so spaced as to hold the spool at either of the limits of its longitudinal shifting movement whenever the spool is shifted by a force in opposition to the holding force of one of the magnets, and means whereby each of the fluid chambers has a constant fluid communication with one of the in-and-out fluid ports of the valve body.

5. The invention as defined by claim 4, wherein said armatures have outer end faces opposing their respective magnets and having a materially greater surface area than the cross sectional area of the valve spool and providing pressure surfaces to be acted upon by fluid under pressure in the chambers.

References Cited by the Examiner
UNITED STATES PATENTS

| | | | |
|---|---|---|---|
| 967,565 | 8/10 | Rohan | 91—413 XR |
| 2,298,457 | 10/42 | Berges | 91—318 |
| 2,834,295 | 5/58 | Hjarpe | 103—49 |
| 2,862,518 | 12/58 | McAlvay | 137—624.27 |

FOREIGN PATENTS 160,375  9/57  Sweden.

M. CARY NELSON, *Primary Examiner.*

MILTON KAUFMAN, *Examiner.*